United States Patent
Gadangi et al.

(10) Patent No.: US 7,287,191 B2
(45) Date of Patent: Oct. 23, 2007

(54) MEASURING MEAN TIME BETWEEN SOFTWARE FAILURES USING CUSTOMER ERROR REPORTING

(75) Inventors: Ashok Kumar Gadangi, San Rafael, CA (US); Joel Stephen Petersen, Petaluma, CA (US)

(73) Assignee: Autodesk, Inc., San Rafael, CA (US)

( * ) Notice: Subject to any disclaimer, the term of this patent is extended or adjusted under 35 U.S.C. 154(b) by 594 days.

(21) Appl. No.: 10/799,091

(22) Filed: Mar. 12, 2004

(65) Prior Publication Data

US 2005/0204200 A1   Sep. 15, 2005

(51) Int. Cl.
G06F 11/00   (2006.01)
(52) U.S. Cl. .......................... 714/38; 717/126
(58) Field of Classification Search ............... 714/38; 717/126
See application file for complete search history.

(56) References Cited

U.S. PATENT DOCUMENTS 6,629,266 B1 *  9/2003  Harper et al. ................. 714/38
6,862,696 B1 *  3/2005  Voas et al. .................... 714/38

OTHER PUBLICATIONS

Woodbury et al. Performance Modeling and Measurement of Real-Time Multiprocessors with Time-Shared Buses.IEEE 1988.*
Murphy et al.Measuring System and Software Reliability using an Automated Data Collection Process.Quality and Reliability Engineering International.1995.*

* cited by examiner

Primary Examiner—Yolanda L Wilson
(74) Attorney, Agent, or Firm—Gates & Cooper LLP

(57) ABSTRACT

A method, apparatus, and article of manufacture for measuring a mean time between program failures by maintaining a running count of program crashes per user per product version on a customer computer, and transmitting this information to a server computer when customers send error reports.

33 Claims, 3 Drawing Sheets

MEASURING MEAN TIME BETWEEN SOFTWARE FAILURES USING CUSTOMER ERROR REPORTING

BACKGROUND OF THE INVENTION

1. Field of the Invention

The present invention generally relates to a system for diagnosing computer programs, and, in particular, to measuring the mean time between software failures using customer error reporting.

2. Description of the Related Art

Software programs often fail by "crashing" or reaching error conditions that cause them to terminate. In order to improve product quality, it is important to diagnose the reasons for failure.

It is well known for software vendors to provide users with a set of tools for capturing and analyzing program crash data. In its simplest form, these tools comprise an error reporting mechanism that presents the users with an alert message that notifies them when a crash occurs and provides an opportunity to forward crash data to the vendor for further analysis. The vendor can then use the forwarded crash data to troubleshoot problems, ultimately leading to more robust and crash-resistant programs.

However, the crash data typically relates to a single failure of a program, and does not provide any information on the number of failures that have previously occurred, or the mean time between program failures. Such information can be very important in categorizing and prioritizing the program failure.

Thus, there is a need in the art for a mechanism where the crash data generated by a program failure includes information on a running count of program crashes per user per product version, and the mean time between program failures. The present invention satisfies that need.

SUMMARY OF THE INVENTION

To address the requirements described above, the present invention discloses a method, apparatus, and article of manufacture for measuring a mean time between program failures by maintaining a running count of program crashes per user per product version on a customer computer, and transmitting this information to a server computer when customers send error reports.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, byway of illustration, several embodiments of the present invention. It is understood that other embodiments may be utilized and structural changes may be made without departing from the scope of the present invention.

Overview

The present invention describes a method for measuring a mean time between program failures by maintaining a running count of program crashes per user per product version on a workstation computer, and transmitting this information to a server computer when the customer sends error reports to the vendor.

Hardware and Software Environment

Figure 1:
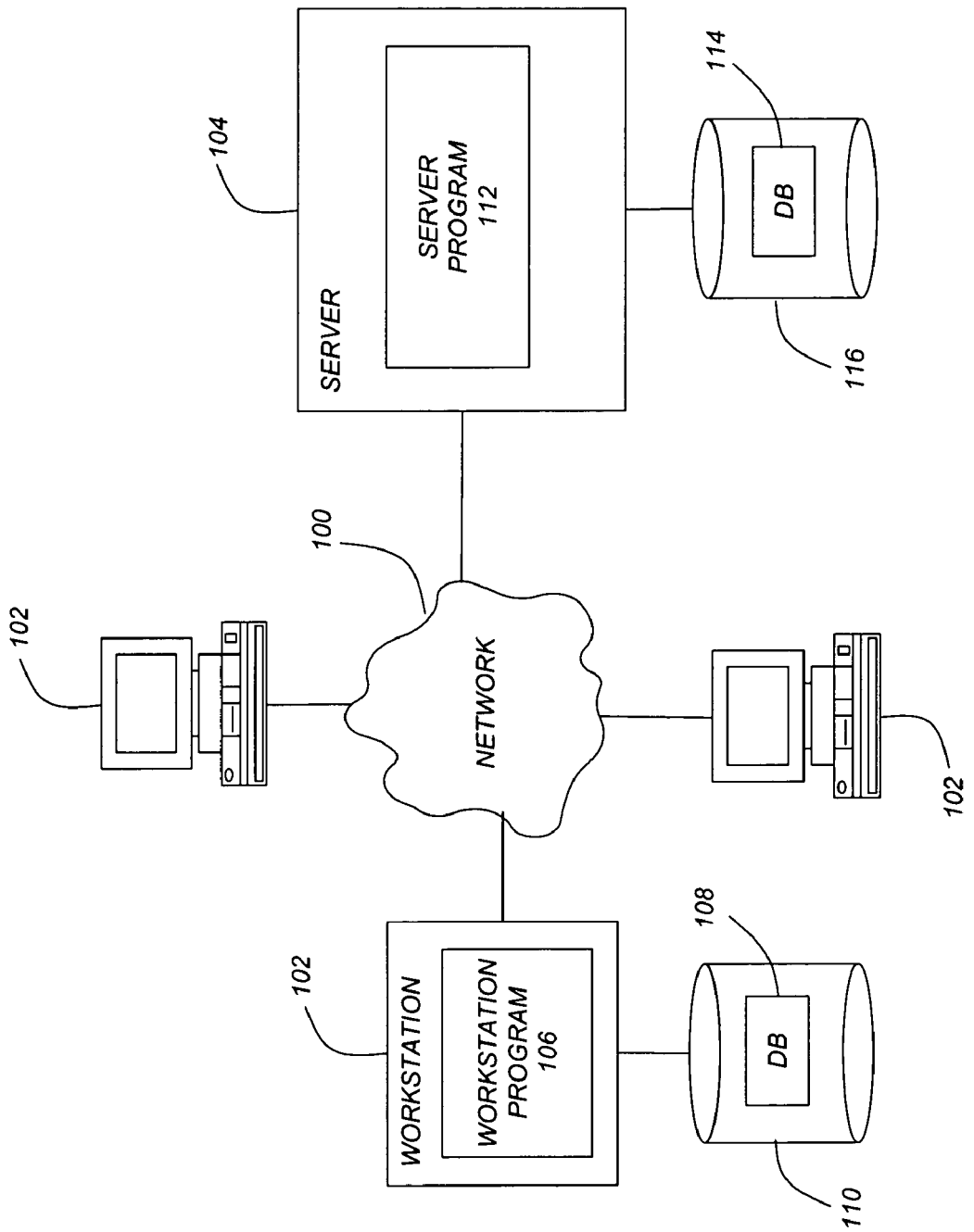
FIG. 1 schematically illustrates an exemplary hardware and software environment used in the preferred embodiment of the present invention.

FIG. 1 schematically illustrates an exemplary hardware and software environment used in the preferred embodiment of the present invention. The present invention is usually implemented using a network 100 to connect one or more workstation computers 102 to one or more of the server computers 104. A typical combination of resources may include workstations 102 that comprise personal computers, network computers, etc., and server computers 104 that comprise personal computers, network computers, workstations, minicomputers, mainframes, etc. The network 100 coupling these computers 102 and 104 may comprise a LAN, WAN, Internet, etc.

Generally, the present invention is implemented using one or more programs, files and/or databases that are executed and/or interpreted by the customer computers 102. In the exemplary embodiment of FIG. 1, these computer programs and databases include a workstation program 106 executed by one or more of the workstations 102, and a database 108 stored on a data storage device 110 accessible from the workstation 102. In addition, the environment often includes one or more server programs 112 executed by the server computer 104, and a database 114 stored on a data storage device 116 accessible from the server computer 104.

Each of the programs and/or databases comprise instructions and data which, when read, interpreted, and executed by their respective computers, cause the computers to perform the steps necessary to execute the steps or elements of the present invention. The computer programs and databases are usually embodied in or readable from a computer-readable device, medium, or carrier, e.g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs and/or databases accessible from any device, carrier, or media.

Of course, those skilled in the art will recognize that the exemplary environment illustrated in FIG. 1 is not intended to limit the present invention. Indeed, those skilled in the art will recognize that other alternative environments may be used without departing from the scope of the present invention.

Mean Time between Program Failures

For each program 106 version and each user using the program 106 on a workstation 102, a unique identifier is generated. For each unique identifier, a running count of program 106 failures is maintained in the database 108 on the workstation 102. When the program 106 fails and the customer sends an error report to the server computer 104, the unique identifier and a running count of program 106 failures experienced so far are sent to the server computer 104.

At the server computer 104, for each unique identifier, the time elapsed between the first and the last error report received is divided by the increase in the running count of program 106 failures during that period to arrive at a mean time between program 106 failures. The mean times between program 106 failures for all unique identifiers are then averaged to obtain an overall mean time between program 106 failures.

Note that the mean time between program 106 failures can be computed as long as a customer sends at least two error reports to the vendor. Even if any program 106 failures that occurred in between were not reported, the mean time between program 106 failures computed will be valid because the second error report will contain a count of all the crashes that occurred in between, whether they were reported to the vendor or not.

This mean time between program 106 failures can be further improved by measuring and transmitting an actual running time for the program 106 on the workstation 102. For this, start and end times can be noted each time the program 106 is used. From the start and end times, a total running time for the program 106 can be computed. Any idle time during each use of the program 106 can also be measured and subtracted from the total running time to obtain an actual running time for the program 106. The ratio of the actual running time for the program 106 and the number of program 106 crashes, averaged over all users, is an excellent metric for measuring the quality of the program 106. These values are then stored in the database 114 on the server computer 104.

Logic of the Preferred Embodiment

Figure 2A:
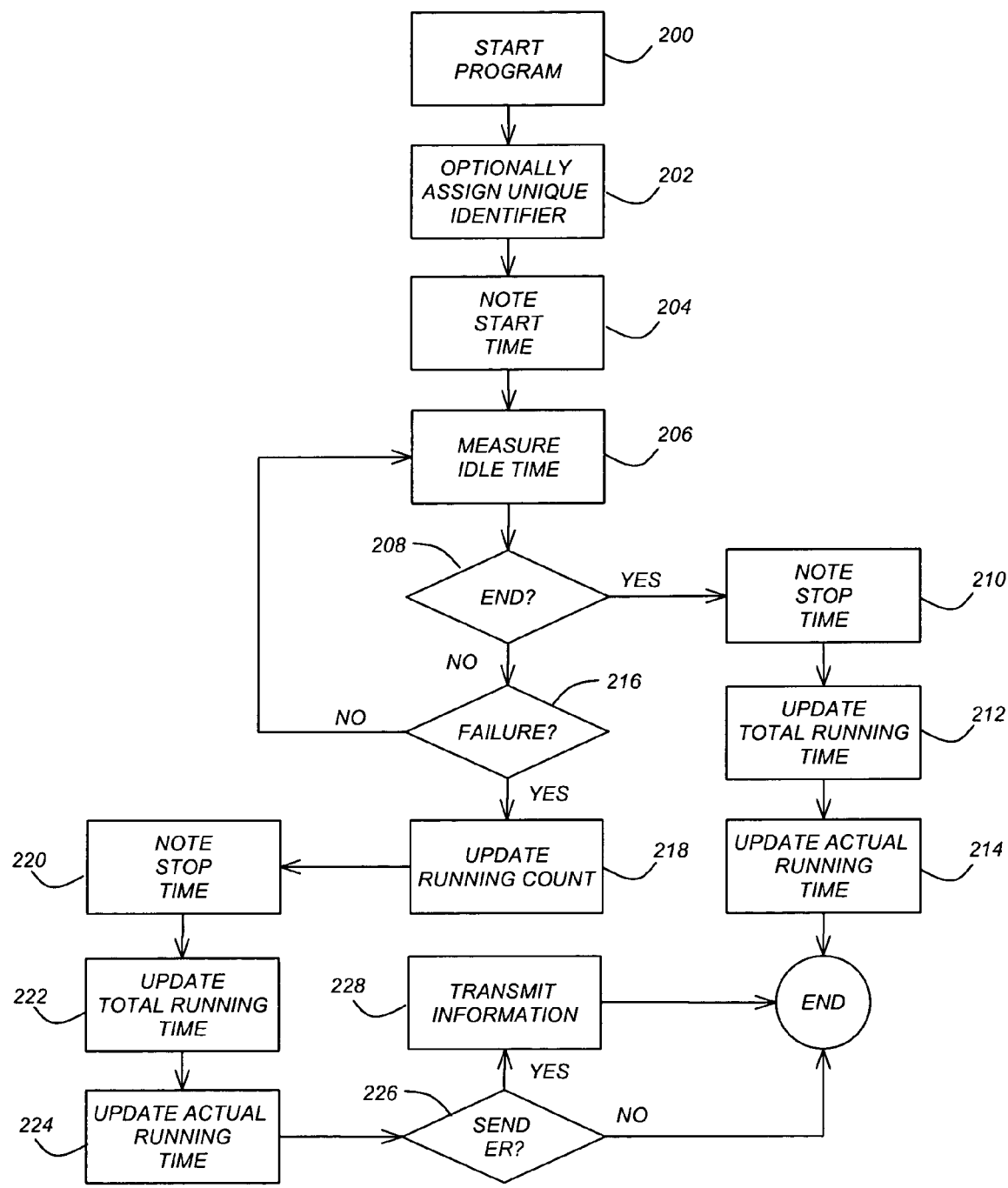
FIGS. 2A and 2B are flowcharts that illustrate the logic performed by the preferred embodiment of the present invention.
Figure 2B:
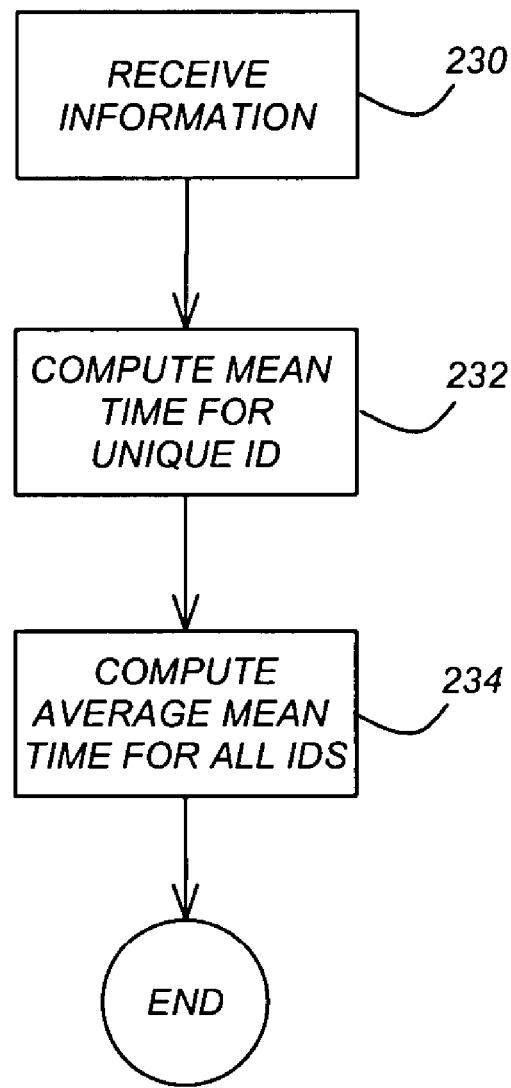

FIGS. 2A and 2B are flowcharts illustrating the logic performed in measuring a mean time between program 106 failures using customer error reporting according to the preferred embodiment of the present invention. FIG. 2A illustrates the logic performed on the workstation 102 and FIG. 2B represents the logic performed on the server computer 104.

Referring to FIG. 2A, Block 200 represents the step of starting the program 106 on the workstation 102.

Block 202 represents the step of optionally assigning a unique identifier for the program 106, if one has not been previously assigned, wherein the unique identifier is maintained for each user of the program 106 and/or each version of the program 106 at the workstation 102.

Block 204 represents the step of noting the start time for the program 106, in order to determine a total running time for the program 106. Tis information is maintained at the workstation 102 for each unique identifier.

Block 206 represents the step of measuring any idle time during each use of the program 106, wherein the idle time is subtracted from the total running time in order to compute an actual running time for the program 106. This information is maintained at the workstation 102 for each unique identifier.

Block 208 is a decision block that represents the step of determining whether the program 108 has ended. If so, control transfers to Block 210; otherwise, control transfers to Block 216.

Block 210 represents the step of noting the stop time for the program 106, in order to determine a total running time for the program 106. This information is maintained at the workstation 102 for each unique identifier.

Block 212 represents the step of updating the total running time for the program 106, using the start and end times. This information is maintained at the workstation 102 for each unique identifier.

Block 214 represents the step of updating the actual running time for the program 106, by subtracting the idle time from the total running time. This information is maintained at the workstation 102 for each unique identifier. Thereafter, the logic ends.

Block 216 is a decision block that represents the step of determining whether a program 106 failure has occurred. If so, control transfers to Block 218; otherwise, control transfers to Block 206.

Block 218 represents the step of updating a running count of program 106 failures at the workstation 102 for each unique identifier. This information is maintained at the workstation 102 for each unique identifier.

Block 220 represents the step of noting the stop time for the program 106, in order to determine a total running time for the program 106. This information is maintained at the workstation 102 for each unique identifier.

Block 222 represents the step of updating the total running time for the program 106, using the start and end times. This information is maintained at the workstation 102 for each unique identifier.

Block 224 represents the step of updating the actual running time for the program 106, by subtracting the idle time from the total running time. This information is maintained at the workstation 102 for each unique identifier.

Block 226 is a decision block that represents the step of determining whether the user has agreed to send error reporting (ER) information to the server computer 104. If so, control transfers to Block 228; otherwise, the logic ends.

Block 228 represents the step of transmitting the information from the workstation 102 to the server computer 104. The transmitted information may include the unique identifier, the running count of program 106 failures associated with the unique identifier, and (optionally) the total running times and/or the actual running times. Thereafter, the logic ends.

Referring to FIG. 2B, Block 230 represents the step of receiving the information at the server computer 104 from the workstation 102. The transmitted information may include the unique identifier, the running count of program 106 failures associated with the unique identifier, and (optionally the total running times and/or the actual running times.

Block 232 represents the step of computing the mean time between program 106 failures at the workstation 102 for the unique id using the transmitted information.

Block 234 represents the step of computing an average mean time between program 106 failures at the workstation 102 for all ids using the transmitted information. In addition, this Block may compute a ratio of the actual running time of the program 106 and the running count of the program 106 failures, averaged over all users. Thereafter, the logic ends.

Conclusion

This concludes the description of the preferred embodiment of the invention. The following describes some alternative embodiments for accomplishing the present invention.

For example, any type of computer, such as a mainframe, minicomputer, work station or personal computer, or network could be used with the present invention. In addition, any software program, application or operating system could benefit from the present invention. It should also be noted that the recitation of specific steps or logic being performed by specific programs are not intended to limit the invention, but merely to provide examples, and the steps or logic could be performed in other ways by other programs without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of measuring a mean time between program failures using customer error reporting, comprising:
    (a) maintaining information concerning the program failures at a customer's computer; and
    (b) transmitting the information to a vendor's computer;
    (c) wherein the information is used to measure the mean time between the program failures at the customer's computer, by maintaining a running count of the program failures and computing the mean time between program failures by dividing a time elapsed between first and last error reports received by the vendor by an increase in the running count during the time elapsed.

2. The method of claim 1, wherein the mean time between program failures is averaged over all users.

3. The method of claim 1, wherein the running count of program failures is maintained per user.

4. The method of claim 1, wherein the running count of program failures is maintained per program version.

5. The method of claim 1, wherein the information further comprises a unique identifier for the program.

6. The method of claim 5, wherein the information further comprises a unique identifier for each user of the program.

7. The method of claim 5, wherein the information further comprises a unique identifier for each version of the program.

8. The method of claim 1, further comprising storing start and end times for each time the program is used on the customer's computer in order to determine a total running time for the program.

9. The method of claim 8, further comprising measuring any idle time during each use of the program and subtracting the idle time from the total running time in order to compute an actual running time for the program.

10. The method of claim 9, further comprising computing a ratio of the actual running time of the program and a running count of the program failures.

11. The method of claim 10, further comprising computing the ratio of the actual running time of the program and the running count of the program failures, averaged over all users.

12. An apparatus for measuring a mean time between program failures using customer error reporting, comprising:
    one or more computers; and
    a memory storing instructions, performed by the computers, for:
    (a) maintaining information concerning the program failures at a customer's computer; and
    (b) transmitting the information to a vendor's computer;
    (c) wherein the information is used to measure the mean time between the program failures at the customer's computer, by maintaining a running count of the program failures and computing the mean time between program failures by dividing a time elapsed between first and last error reports received by the vendor by an increase in the running count during the time elapsed.

13. The apparatus of claim 12, wherein the mean time between program failures is averaged over all users.

14. The apparatus of claim 12, wherein the running count of program failures is maintained per user.

15. The apparatus of claim 12, wherein the running count of program failures is maintained per program version.

16. The apparatus of claim 12, wherein the information further comprises a unique identifier for the program.

17. The apparatus of claim 16, wherein the information further comprises a unique identifier for each user of the program.

18. The apparatus of claim 16, wherein the information further comprises a unique identifier for each version of the program.

19. The apparatus of claim 12, further comprising logic for storing start and end times for each time the program is used on the customer's computer in order to determine a total running time for the program.

20. The apparatus of claim 19, further comprising logic for measuring any idle time during each use of the program and subtracting the idle time from the total running time in order to compute an actual running time for the program.

21. The apparatus of claim 20, further comprising logic for computing a ratio of the actual running time of the program and a running count of the program failures.

22. The apparatus of claim 21, further comprising logic for computing the ratio of the actual running time of the program and the running count of the program failures, averaged over all users.

23. An article of manufacture comprising a program storage device embodying instructions that, when executed by a computer, cause the computer to perform a method for measuring a mean time between program failures using customer error reporting, the method comprising.

24. The article of claim 23, wherein the mean time between program failures is averaged over all users.

25. The article of claim 23, wherein the running count of program failures is maintained per user.

26. The article of claim 23, wherein the running count of program failures is maintained per program version.

27. The article of claim 23, wherein the information further comprises a unique identifier for the program.

28. The article of claim 27, wherein the infonnarion further comprises a unique identifier for each user of the program.

29. The article of claim 27, wherein the information further comprises a unique identifier for each version of the program.

30. The article of claim 23, further comprising storing start and end times for each time the program is used on the customer's computer in order to determine a total running time for the program.

31. The article of claim 30, further comprising measuring any idle time during each use of the program and subtracting the idle time from the coral running time in order to compute an actual running time for the program.

32. The article of claim 31, further comprising computing a ratio of the actual running time of the program and a running count of the program failures.

33. The article of claim 32, further comprising computing the ratio of the actual running time of the program and the running count of the program failures, averaged over all users.

* * * * *

UNITED STATES PATENT AND TRADEMARK OFFICE
CERTIFICATE OF CORRECTION

| | | |
|---|---|---|
| PATENT NO. | : 7,287,191 B2 | |
| APPLICATION NO. | : 10/799091 | |
| DATED | : October 23, 2007 | |
| INVENTOR(S) | : Gadangi et al. | |

It is certified that error appears in the above-identified patent and that said Letters Patent is hereby corrected as shown below:

Column 6:

Claim 23, line 34, please delete "." and insert --;

(a) maintaining information concerning the program failures at a customer's computer; and (b) transmitting the information to a vendor's computer;

(c) wherein the information is used to measure the mean time between the program failures at the customer's computer, by maintaining a running count of the program failures and computing the mean time between program failures by dividing a time elapsed between first and last error reports received by the vendor by an increase in the running count during the time elapsed.--

Signed and Sealed this

Twelfth Day of October, 2010

David J. Kappos
*Director of the United States Patent and Trademark Office*